United States Patent
Nafziger et al.

(10) Patent No.: US 10,485,173 B2
(45) Date of Patent: Nov. 26, 2019

(54) WINDROW MERGER ATTACHMENT

(71) Applicant: AGCO Corporation, Duluth, GA (US)

(72) Inventors: Brendon C. Nafziger, Hesston, KS (US); Douglas R. Treffer, Newton, KS (US); Shane Bollinger, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 15/813,362

(22) Filed: Nov. 15, 2017

(65) Prior Publication Data
US 2018/0132420 A1   May 17, 2018

Related U.S. Application Data

(60) Provisional application No. 62/422,443, filed on Nov. 15, 2016.

(51) Int. Cl.
| | |
|---|---|
| A01D 57/00 | (2006.01) |
| A01D 61/00 | (2006.01) |
| A01D 41/12 | (2006.01) |
| A01B 63/10 | (2006.01) |
| A01B 63/00 | (2006.01) |
| A01D 43/04 | (2006.01) |
| A01D 57/20 | (2006.01) |
| A01B 63/02 | (2006.01) |

(52) U.S. Cl.
CPC .......... A01D 61/002 (2013.01); A01B 63/008 (2013.01); A01B 63/10 (2013.01); A01D 41/1243 (2013.01); A01D 43/04 (2013.01); A01D 57/20 (2013.01); A01B 63/02 (2013.01)

(58) Field of Classification Search
USPC .......................................................... 56/192
See application file for complete search history.

(56) References Cited

U.S. PATENT DOCUMENTS

| | | | | |
|---|---|---|---|---|
| 4,429,517 A | * | 2/1984 | Lohrentz | A01D 57/20 198/314 |
| 5,111,636 A | * | 5/1992 | Quirin | A01B 73/042 56/367 |
| 5,203,154 A | * | 4/1993 | Lesher | A01D 57/12 56/366 |
| 5,272,860 A | * | 12/1993 | Baril | A01D 84/00 56/10.7 |
| 5,855,245 A | * | 1/1999 | Gerein | A01B 63/10 172/328 |
| 6,205,757 B1 | * | 3/2001 | Dow | A01D 57/20 56/366 |
| 6,415,590 B1 | | 7/2002 | Lohrentz | |

(Continued)

Primary Examiner — Thomas B Will
Assistant Examiner — Mai T Nguyen

(57) ABSTRACT

A windrower includes a header having a crop cutting and a crop conditioning mechanism for conditioning crop material severed from the field and for discharging the conditioned material in a rearwardly directed stream as the windrower moves across the field. The windrower has a crop merger attachment with a conveyor configured to receive crop material from the crop conditioning mechanism and direct the crop material to a side of the windrower to form a windrow on the ground to the side of the windrower when in an operation position or to direct the crop material to the ground beneath the windrower when in a nonoperational position.

12 Claims, 7 Drawing Sheets

(56) References Cited

U.S. PATENT DOCUMENTS

| | | | |
|---|---|---|---|
| 6,775,968 B2* | 8/2004 | Carlot | A01D 43/10 |
| | | | 56/192 |
| 7,028,459 B2 | 4/2006 | Lohrentz et al. | |
| 7,484,349 B2 | 2/2009 | Talbot et al. | |
| 7,526,908 B1* | 5/2009 | Rice | A01D 57/00 |
| | | | 56/192 |
| 7,624,561 B2 | 12/2009 | McLean et al. | |
| 8,353,377 B2* | 1/2013 | Geiger | B60B 35/10 |
| | | | 180/209 |
| 9,554,518 B2 | 1/2017 | Murray et al. | |
| 9,736,983 B2 | 8/2017 | Treffer et al. | |
| 2001/0045087 A1* | 11/2001 | Franet | A01D 57/20 |
| | | | 56/192 |
| 2005/0120696 A1* | 6/2005 | Lohrentz | A01D 57/20 |
| | | | 56/192 |
| 2007/0068131 A1* | 3/2007 | Talbot | A01D 43/077 |
| | | | 56/192 |
| 2009/0139196 A1* | 6/2009 | McLean | A01D 84/00 |
| | | | 56/14.7 |

* cited by examiner

WINDROW MERGER ATTACHMENT

CROSS REFERENCE TO RELATED APPLICATION

This application claims the benefit of U.S. Provisional Application No. 62/422,443 filed Nov. 15, 2016, which is hereby incorporated by reference in its entirety.

BACKGROUND OF THE INVENTION

Field of Invention

The present disclosure is generally related to agricultural equipment and, more particularly, is related to crop discharge mechanisms of a windrower.

Description of Related Art

Windrowers have been used in farming operations to cut and condition hay and other crops and to selectively deposit the crop on the ground in either a windrow or a swath. Windrowers are often provided with a swathboard located behind the conditioning mechanism of the machine generally in the path of travel of the stream of conditioned materials as they are discharged rearwardly through the air by the conditioning mechanism. When the swathboard is positioned in a lowered position, the stream of crop materials will engage the swathboard and be directed down to the ground under the machine.

Windrowers may also be provided with a merger attachment that connects to the underside of the windrower that combines up to three windrows into a single large windrow as the windrower makes successive passes through the field. The merger attachment typically has a conveyor driven by a hydraulic motor that throws the crop to the right side of the machine. The merger attachment can be lowered to its operating position or raised with a hydraulic cylinder to a position where the crop can bypass the merger attachment.

In one method of combining three windrows into one, the first windrow is cut and dropped directly under the windrower while the merger attachment is raised and not engaged. The next path after a right-hand headland turn will be able to throw the crop back onto the first windrow using the merger attachment in an operational position. Then after a second right-hand headland turn skipping over the first pass, the merger will then set the third windrow on top of the previous combined windrows using the merger attachment in an operational position.

It is desirable to have a windrower merger attachment with an improved mechanism for moving the conveyor between its raised and operational positions. It is also desirable to have a merger attachment that allows for movement of the conveyor in an upward direction in the instance the merger attachment were to contact an obstacle in the field while the merger attachment is in the operational position.

BRIEF SUMMARY OF THE INVENTION

Briefly stated, one aspect of the invention is directed to a windrower having mechanism for conditioning crop material severed from the field and for discharging the conditioned material in a rearwardly directed stream as the windrower moves across the field. The windrower includes a header having a crop cutting and a crop conditioning mechanism. The windrower has a crop merger attachment with a conveyor configured to receive crop material from the crop conditioning mechanism and direct the crop material to a side of the windrower to form a windrow on the ground to the side of the windrower.

This summary is provided to introduce concepts in simplified form that are further described below in the Description of Preferred Embodiments. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiment.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF PREFERRED EMBODIMENTS

Figure 1:
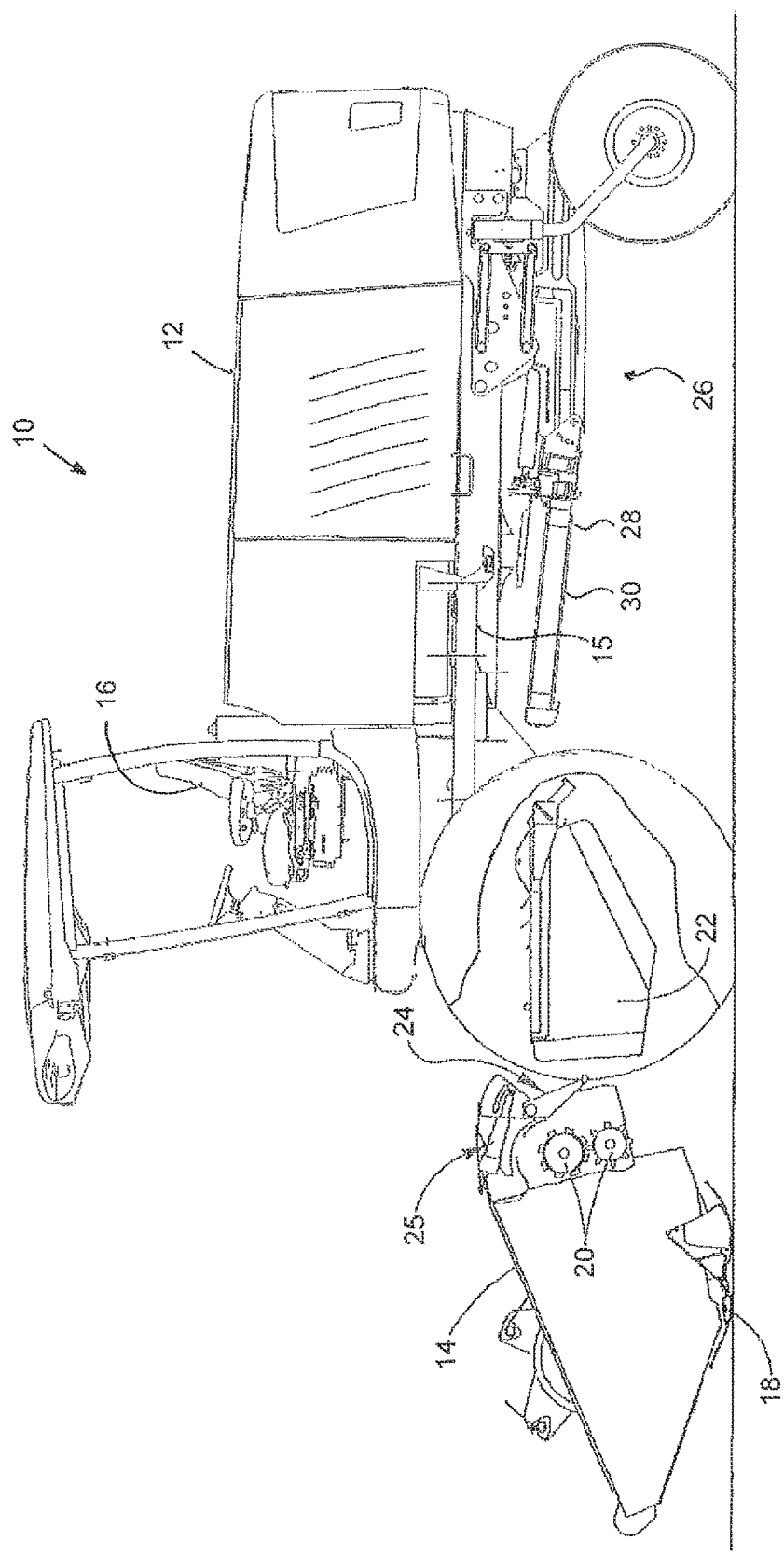
FIG. 1 is schematic side elevational view of a self-propelled windrower embodying the principles of the present invention.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

FIG. 1 illustrates a self-propelled windrower 10. The windrower 10 broadly comprises a self-propelled tractor 12 and a harvesting header 14 attached to a frame 15 of the tractor 12. The operator drives the harvester 10 from the operator station or tractor seat 16, and from which he also operates the various components of the header 14. The header 14 may be detachably coupled to the tractor 12, and may be embodied as one of a variety of widths as is known. The header 14 includes a cutter 18 for severing standing crops as the machine moves through the field, conditioning mechanism in the form of a pair of conditioner rolls 20, and may include a pair of rearwardly converging windrow forming shields 22 behind the conditioner rolls 20. As the features and function of the structural assembly of the tractor 12 and header 14 are well-known in the agricultural equipment industry, further discussion of the same is omitted here for brevity.

A swathboard 24 is located between the conditioner rolls 20 and the forming shields 22 and is moveable between raised and lowered positions to selectively direct the crop. In relevant part, the conditioner rolls 20 have the characteristic of projecting a stream of conditioned materials rearwardly therefrom and toward the swathboard 24 as the crop materials issue from the rolls 20. A remotely operated actuator 25 in the form of an electromechanical device is operably connected to the swathboard 24 to change the position of the swathboard. In one known embodiment, actuator 25 contains a small, reversible electric motor which drives a worm gear and the swathboard 24 is fixed to a transversely extending tube. A crank is fixed to the tube and projects upwardly therefrom for rotating the crank and thus the swathboard between the fully raised position and the fully lowered position. However, the actuator 25 may also use a hydraulic cylinder or other means to move the swathboard 24 between the raised and lowered positions using sound engineering judgment. With the swathboard 24 fully lowered, the stream of crop material issuing from the conditioner rolls 20 impinges against the swathboard 24 and is directed to the ground. On the other hand, when the swathboard 24 is fully raised, the crop stream substantially misses the swathboard 24 and continues rearward. As the features and function of the swathboard 24 are well-known in the agricultural equipment industry, further discussion of the same is omitted here for brevity.

The windrower 10 has a merger attachment 26 comprising a conveyor frame 28 coupled to the windrower. Moveable circuitously within the conveyor frame 28 is a conveyor 30 that receives the cut crop discharged from the header 14. In one embodiment, the conveyor 30 comprises an endless, elastomeric belt, though in some embodiments, additional belts and/or other materials or types of conveying mediums (e.g., slats, chains, etc.) may be used. As would be understood by one skilled in the art, the conveyor frame 28 comprises plural rollers (not shown) over which the conveyor 30 circuitously travels.

Figure 2:
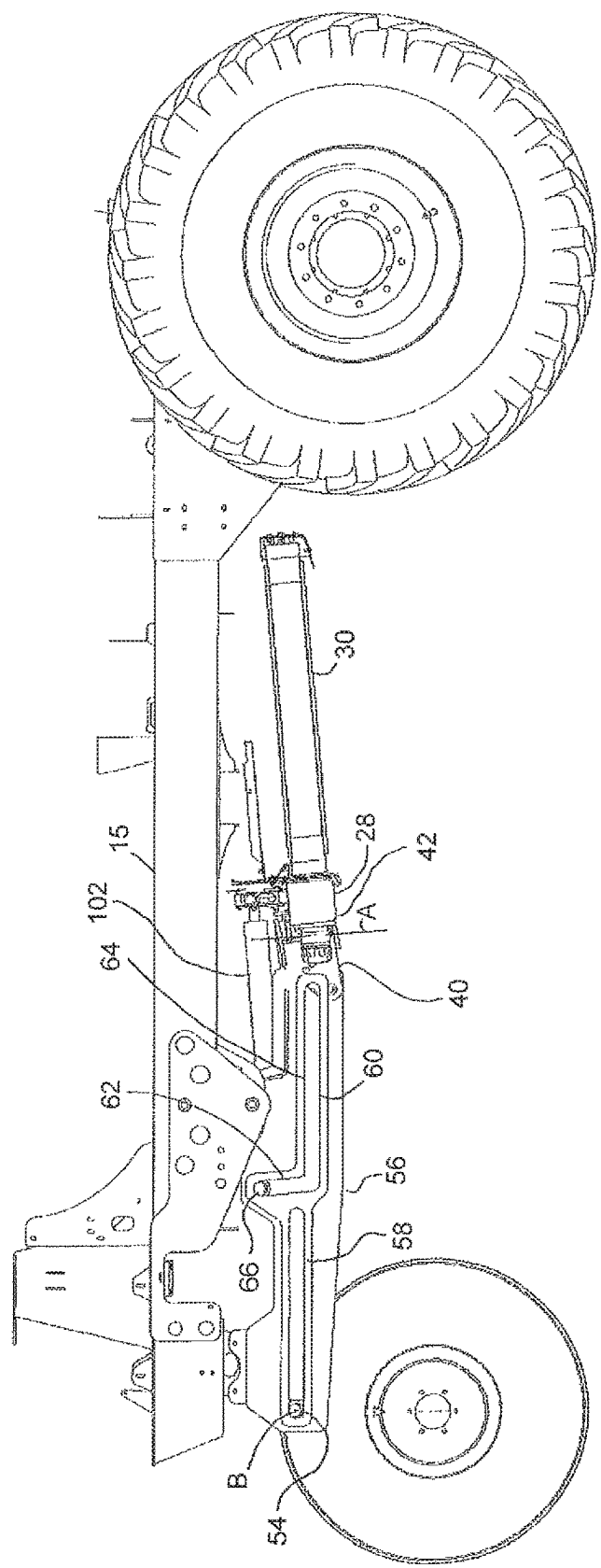
FIG. 2 is a side view of a portion of the windrower of FIG. 1 showing a merger attachment in a raised position.
Figure 3:
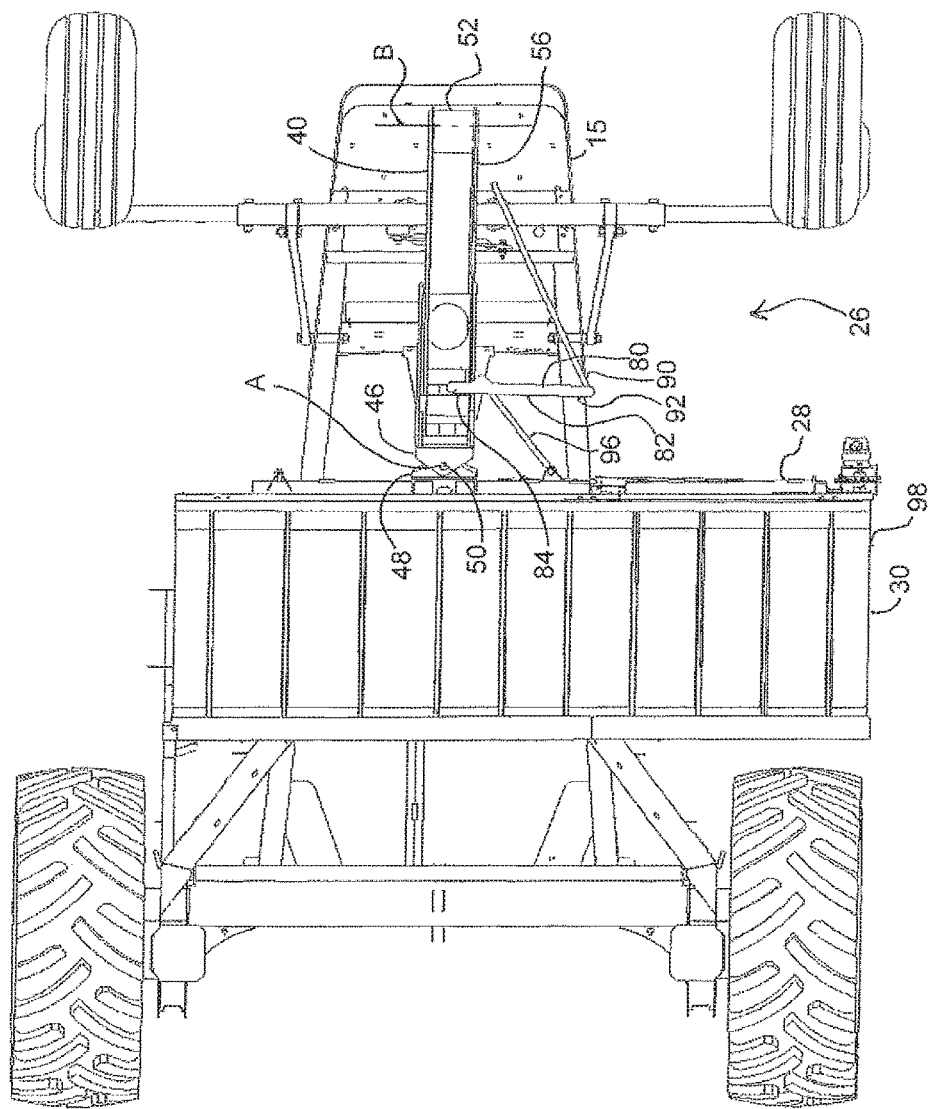
FIG. 3 is a bottom view of the portion of the windrower of FIG. 2 showing the merger attachment in the raised position.
Figure 4:
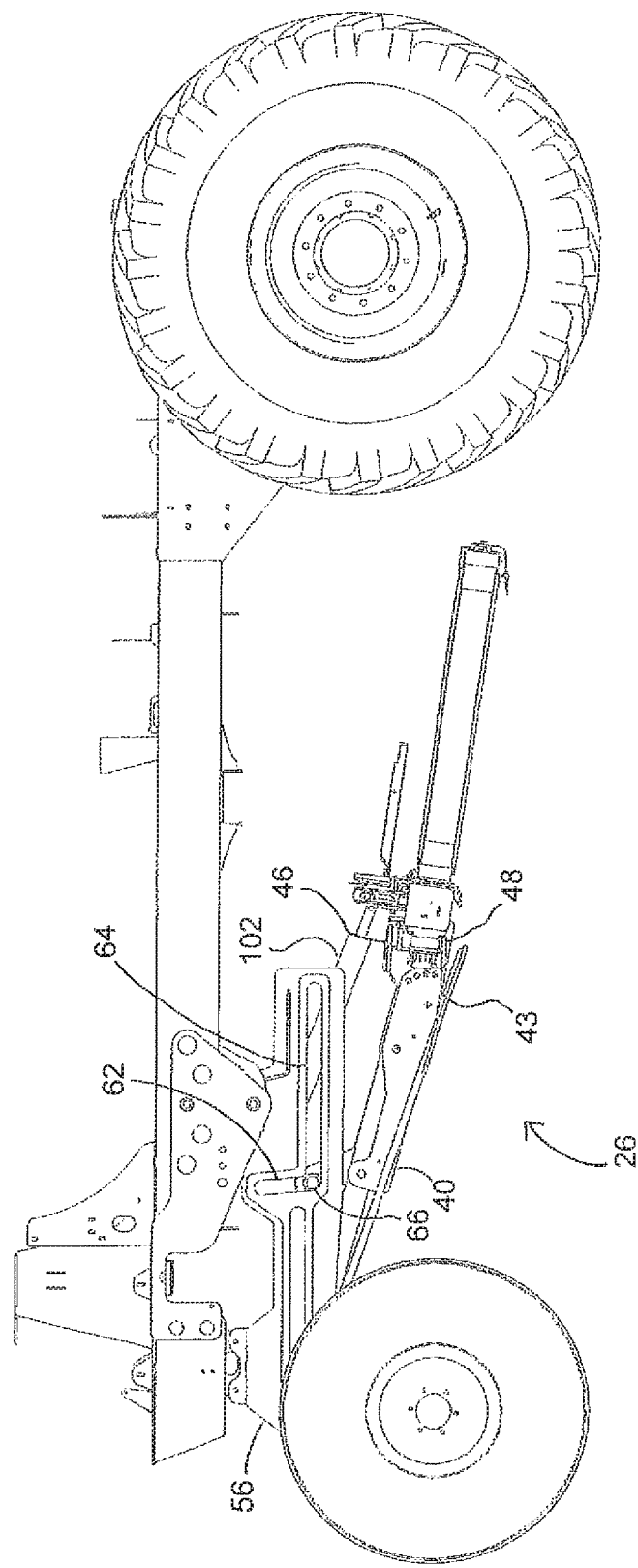
FIG. 4 is a side view of the portion of the windrower of FIG. 2 showing the merger attachment in a mid position.
Figure 5:
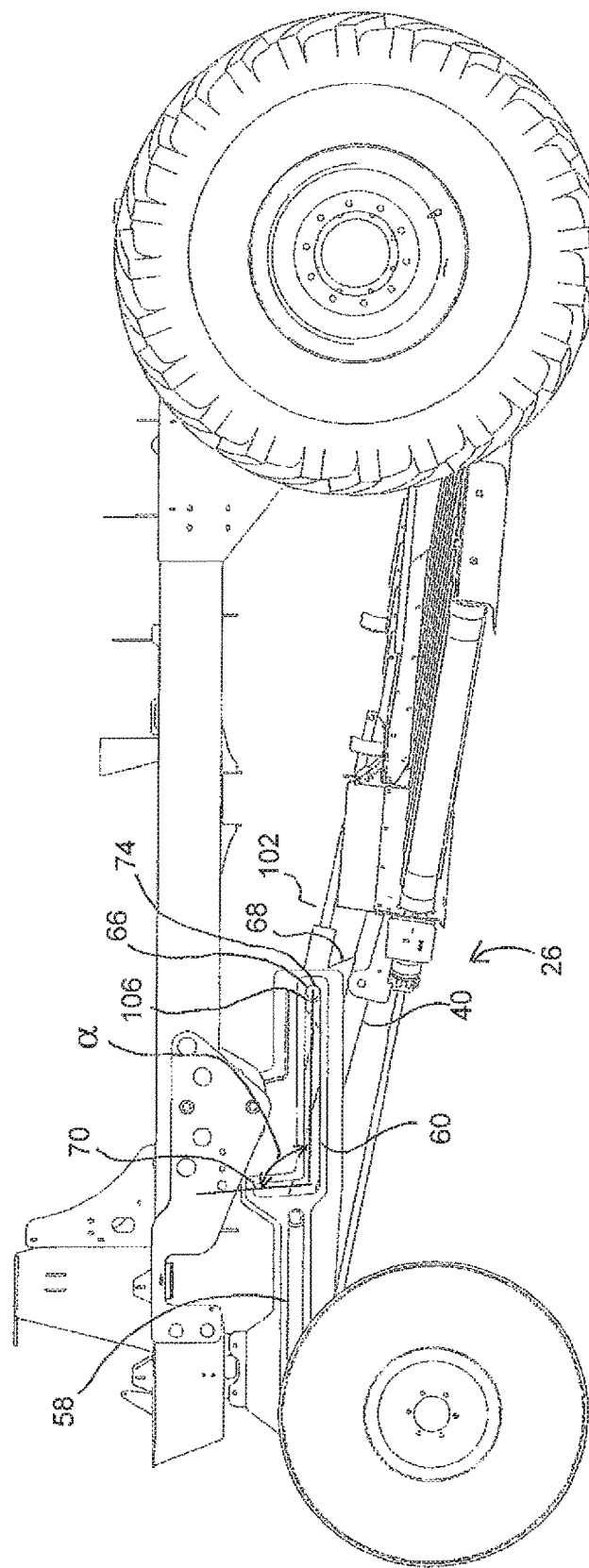
FIG. 5 is a side view of the portion of the windrower of FIG. 2 showing the merger attachment in an operational position.
Figure 6:
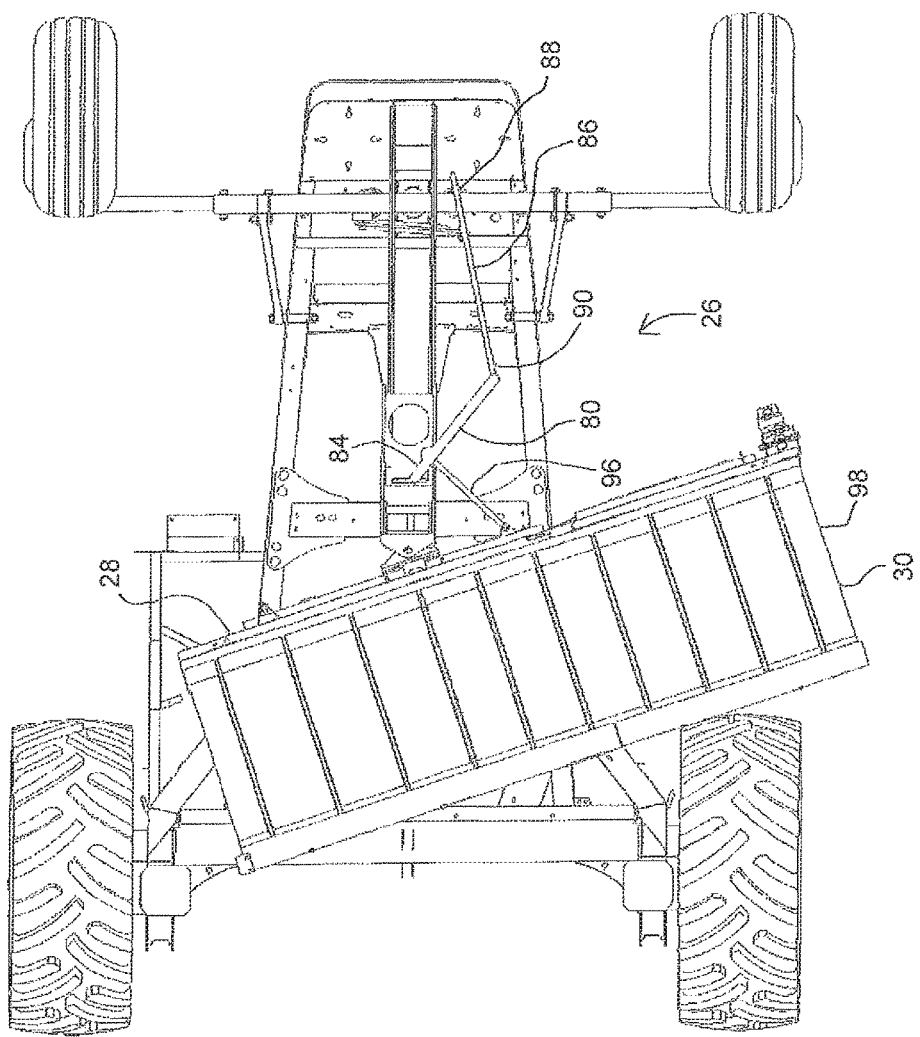
FIG. 6 is a bottom view of the portion of the windrower of FIG. 2 showing the merger attachment in the operational position.
Figure 7:
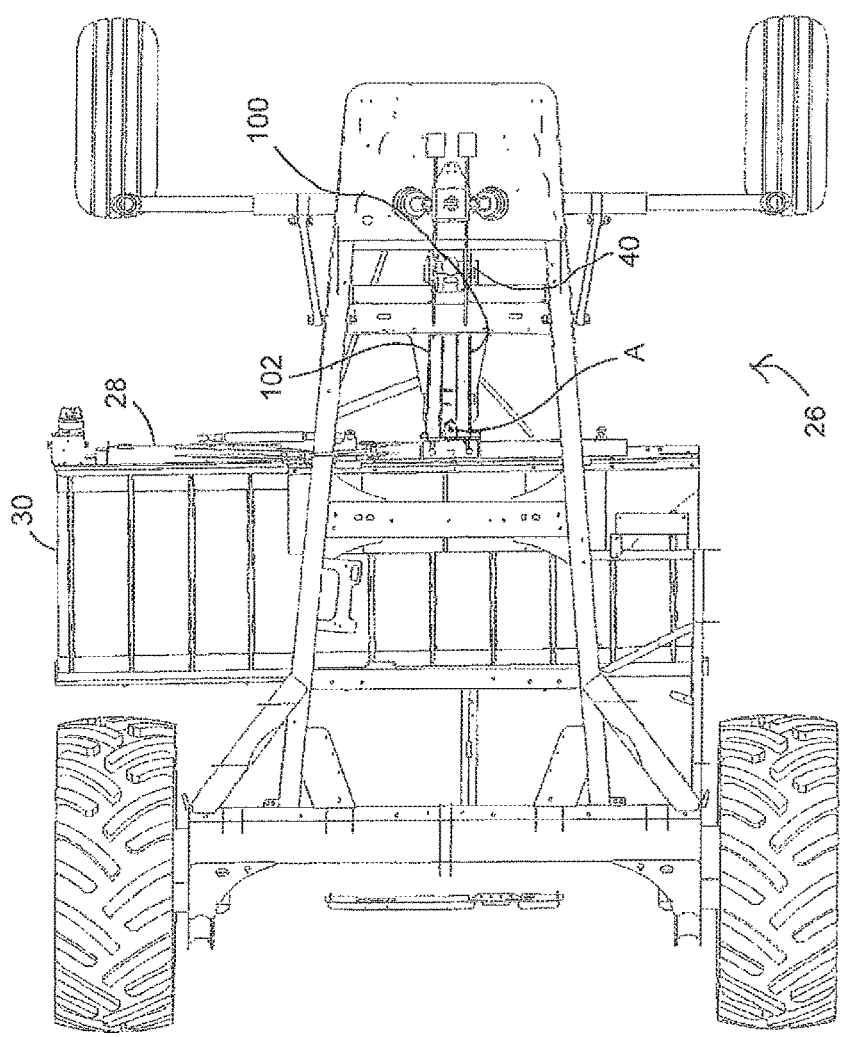
FIG. 7 is a top view of the portion of the windrower of FIG. 2 showing the merger attachment in the raised position.

The conveyor frame 28 of the merger attachment 26 is positionable between a raised position as shown in FIGS. 2 and 3 in which the conveyor 30 is positioned above and out of the way of the stream of crop material coming from the conditioner rolls 20, an intermediate position as shown in FIG. 4, and a lowered, operational position as shown in FIGS. 5 and 6 in which the crop material coming from the conditioner rolls 20 is directed rearward passed the swathboard 24 lands on the conveyor 30.

According to the invention, the merger attachment 26 has a conveyor mounting arm 40 connected to a rear portion 42 of the conveyor frame 28. The conveyor frame 28 is mounted on a forward end 43 of the conveyor mounting arm 40 with a pivot mechanism 44 having a substantially vertical pivot axis A. In one embodiment as best seen in FIGS. 3 and 4, a clevis 46 at the forward end 43 of the conveyor mounting arm 40 is pinned to a tang 48 on the conveyor frame 28 with a suitable pivot pin 50. However, other connections that enable pivoting of the conveyor frame 28 relative the conveyor mounting arm 40 about a substantially vertical axis may be used using sound engineering judgement.

A rear end 52 of the conveyor mounting arm 40 is mounted to the frame 15 of the tractor 12 so as to pivot about a substantially horizontal and transverse pivot axis B. In the illustrated embodiment, a rear guide bearing 54 is received by a merger bracket 56 and the mounting arm 40 is configured to pivot about the rear guide bearing 54. As best seen in FIG. 2, the merger bracket 56 has a rear guide track 58 and a front guide track 60. The rear guide track 58 is desirably substantially linear in a forward and aft direction along the frame 15. By substantially linear, it is meant that the rear guide track 58 has a straight axis or an axis that deviates from a straight line by no more than a few degrees, such as between 0 and 5 degrees. The rear guide bearing 54 is received in the rear guide track 58 such that the rear guide bearing 54 is capable of forward and aft movement in the rear guide track 58. The front guide track 60 has a compound shape having first portion 62 and a second portion 64, with the second portion extending at an angle α relative the first portion. Desirable, the first and second portions 62, 64 are perpendicular or substantially perpendicular such that the angle α is at least 70 degrees but not more than 110 degrees, and more desirably at least 80 degrees, and in one embodiment is 90 degrees. In one embodiment, the first portion 62 of the front guide track 60 is substantially vertical relative a level ground surface and the second portion 64 is directed in a substantially forward and aft direction.

A forward guide bearing 66 is attached to the mounting arm 40 at a fixed position intermediate the rear end 52 and the forward end 43 of the mounting arm 40 with a hanger 68. The forward guide bearing 66 is received in the front guide track 60 and is moveable between a raised position in which the forward guide bearing 66 is at a first end 70 at the upper end of the first portion 62 and an operational position in which the forward guide bearing 66 is moved to a second end 74 at the forward end of the second portion 64 of the front guide track 60. Preferably, the horizontal travel of the second portion 64 of the front guide track 60 is between about 600 mm and 700 mm, and in one embodiment is 655 mm. Preferably, the vertical travel of the first portion 62 of the front guide track is between about 150 mm and 200 mm, and in one embodiment is 172 mm. The movement of the mounting arm 40 is based on the center line travel of the forward guide bearing 66. Desirably, the forward guide bearing 66 travels through a centerline radius of 15 mm as it transitions from the first segment 62 to the second segment 64 to allow radial contact of the bearing through the transition.

As best seen in FIGS. 3 and 6, a pivot linkage 80 extends between a fixed position near the rear of the tractor 12 and the conveyor frame 28. The pivot linkage 80 includes a crank arm 82 that is povotably mounted at an inner end 84 to the conveyor mounting arm 40. A rear link arm 86 has a rear end tied 88 to the tractor frame 15 and a forward end 90 connected to an outer end 92 of the crank arm 82. A forward link arm 96 is connected to the crank arm 82 at a position intermediate the inner end 84 and outer end 92 of the crank arm 82 and to the conveyor frame 28 at a position intermediate a discharge end 98 of the conveyor frame 28 and the pivot mechanism 44.

The merger attachment 26 has at least one actuator 100 that moves the merger attachment such that the forward guide bearing 66 moves downward in the first portion 62 of the front guide track 60 and then the rear guide bearing 54 and forward guide bearing 66 move forward in the rear guide track 58 and front guide track 60, respectively. In the illustrated embodiment, there is a first actuator 100 and a second actuator 102 mounted generally parallel, with the second actuator 102 on the opposite side of the mounting arm 40, that move the merger attachment 26 and together with the pivot linkage 80 force the merger attachment 26 to pivot about pivot axis A. Alternately, the first actuator 100 primarily moves the merger attachment 26 such that the forward guide bearing 66 moves downward in the first portion 62 of the front guide track 60 and the second actuator 102 primarily moves the merger attachment 26 such that the rear guide bearing 54 and forward guide bearing 66 move forward in the rear guide track 58 and front guide track 60, respectively. Desirably, the first and second actuators 100, 102 are hydraulic cylinders, however other known actuators may be used. In one embodiment, the first and second actuators 100, 102 are hydraulic cylinders configured in parallel in a hydraulic system such that actuation of the hydraulic system causes the first and second actuators 100, 102 to move the merger attachment 26 as constrained by the rear guide track 58 and front guide track 60.

In one embodiment, an upper surface 106 of the second end 74 of the front guide track 60 is configured to allow for movement of the forward guide bearing 66 in an upward direction in the instance the merger attachment 26 were to contact an obstacle in the field to allow the conveyor frame 28 to pivot upwards while the merger attachment 26 is in the operational position.

The conveyor frame 28 is moved from its raised position as shown in FIG. 2 to a midpoint position as shown in FIG. 3 as the forward guide bearing 66 moves down the vertical portion of the front guide track 60 from the raises position at the upper end to a mid position at the intersection of the vertical portion and the horizontal portion of the front guide track 60. In moving from the raised position to the midpoint position, the mounting arm 40 and conveyor frame are pivoted about axis B at the rear guide bearing 54. The conveyor frame is then moved from the mid position to the operational position as shown in FIGS. 5 and 6 by having both the rear guide bearing 54 and the forward guide bearing 66 moves forward in the rear guide track 58 and the front guide track 60, respectively. As the mounting arm 40 moves forward, the pivot linkage causes the conveyor frame to pivot about an axis near a discharge end of the conveyor 30 while the conveyor frame 28 pivots about the pivot axis A of the pivot mechanism 44 at the forward end of the mounting arm 40. This causes an inward side of the conveyor frame 28 to move forward relative the discharge end.

In one example windrower operation, during one pass across the field by the windrower 10, the swathboard 24 is oriented in the lowered position and the merger attachment 26 is oriented in the raised position. With the merger attachment 26 in the raised position, the windrower 10 discharges cut crop onto the field in between the front wheels of the windrower 10. Upon reaching a point where the operator of the windrower 10 seeks to turn the windrower 10 around, the operator activates (or in some embodiments, the activation is automatic based on the detected coordinate position and/or heading) the merger attachment 26. The merger attachment 26 is lowered to the mid position (FIG. 4) and then rotated to the operational position (FIG. 5) as set forth above. With the merger attachment 26 in the operational position, the windrower 10 discharges cut crop onto the field to the side of the windrower 10 on top of the windrow laid in the first pass. The windrower 10 may then conduct a third pass adjacent to but traveling in the direction of the first pass in which the cut crop is discharged to the side of the windrower 10 onto the windrow laid in the first two passes.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

The invention claimed is:

1. A windrower having mechanism for conditioning crop material severed from a field and for discharging the conditioned material in a rearwardly directed stream as the windrower moves across the field, the windrower comprising:
   a tractor frame;
   a header attached at a forward end of the tractor frame comprising a crop cutting and a crop conditioning mechanism;
   a crop merger attachment comprising a conveyor and a conveyor frame configured to receive crop material from the crop conditioning mechanism and direct the crop material to a side of the windrower to form a windrow on the ground to the side of the windrower, the crop merger attachment being mounted for adjusting movement between an operational, lowered position in which the crop material is directed onto the conveyor and a non-operational, raised position in which the stream of crop material is directed away from the crop merger attachment, the crop merger attachment comprising:
   a conveyor mounting arm connected to the conveyor frame with a pivot mechanism having a substantially vertical pivot axis, wherein a rear end of the conveyor mounting arm is mounted to the tractor frame so as to pivot about a substantially horizontal pivot axis;
   a rear guide bearing attached to the conveyor mounting arm;
   a front guide bearing attached to the conveyor mounting arm at a fixed position intermediate the rear guide bearing and the conveyor frame;
   a merger bracket having a rear guide track and a front guide track, wherein the rear guide track is substantially linear in a forward and aft direction along the tractor frame, wherein the rear guide bearing is received in the rear guide track such that the rear guide bearing is capable of forward and aft movement in the rear guide track, and wherein the front guide track has a compound shape having first portion and a second portion, with the second portion extending at an angle α relative the first portion, wherein the front guide bearing is received in the front guide track and is moveable between a raised position in which the front guide bearing is at a first end of the first portion and an operational position in which the front guide bearing is moved to a second end at a forward end of the second portion of the front guide track; and at least one actuator that moves the merger attachment such that the front guide bearing moves downward in the first portion of the front guide track.

2. The windrower of claim 1 wherein the first portion of the front guide track is substantially vertical relative a level ground surface and the second portion is directed in a substantially forward and aft direction.

3. The windrower of claim 1 further comprising a pivot linkage extending between a fixed position near the rear of the tractor frame and the conveyor frame, the pivot linkage comprising a crank arm that is pivotably mounted at an inner end to the conveyor mounting arm.

4. The windrower of claim 3 wherein the pivot linkage further comprises a rear link arm having a rear end connected to the tractor frame and a forward end connected to an outer end of the crank arm.

5. The windrower of claim 1 wherein the at least one actuator moves the merger attachment such that the rear guide bearing and front guide bearing move forward in the rear guide track and front guide track, respectively.

6. The windrower of claim 5 wherein the at least one actuator comprises a first actuator and a second actuator.

7. A windrower having mechanism for conditioning crop material severed from a field and for discharging the conditioned material in a rearwardly directed stream as the windrower moves across the field, the windrower comprising:
   a tractor frame;
   a header attached at a forward end of the tractor frame comprising a crop cutting and a crop conditioning mechanism;
   a crop merger attachment comprising a conveyor and a conveyor frame configured to receive crop material from the crop conditioning mechanism and direct the crop material to a side of the windrower to form a windrow on the ground to the side of the windrower, the crop merger attachment being mounted for adjusting movement between an operational, lowered position in which the crop material is directed onto the conveyor and a non-operational, raised position in which the stream of crop material is directed away from the crop merger attachment, the crop merger attachment comprising:
   a conveyor mounting arm connected to the conveyor frame with a pivot mechanism having a substantially vertical pivot axis, wherein a rear end of the conveyor mounting arm is mounted to the tractor frame so as to pivot about a substantially horizontal pivot axis;
   a rear guide bearing attached to the conveyor mounting arm;
   a front guide bearing attached to the conveyor mounting arm at a fixed position intermediate the rear guide bearing and the conveyor frame; and
   a merger bracket having a rear guide track and a front guide track, wherein the rear guide track is substantially linear in a forward and aft direction along the tractor frame, wherein the rear guide bearing is received in the rear guide track such that the rear guide bearing is capable of forward and aft movement in the rear guide track, and wherein the front guide track has a compound shape having first portion and a second portion, with the second portion extending at an angle α relative the first portion, wherein the front guide bearing is received in the front guide track and is moveable between a raised position in which the front guide bearing is at a first end of the first portion and an operational position in which the front guide bearing is moved to a second end at a forward end of the second portion of the front guide track;
   a pivot linkage extending between a fixed position near the rear of the tractor frame and the conveyor frame, the pivot linkage comprising a crank arm that is pivotably mounted at an inner end to the conveyor mounting arm, wherein the pivot linkage further comprises a rear link arm having a rear end connected to the tractor frame and a forward end connected to an outer end of the crank arm, wherein the pivot linkage further comprises a forward link arm connected to the crank arm at a position intermediate the inner end and outer end of the crank arm and to the conveyor frame at a position intermediate a discharge end of the conveyor frame and the pivot mechanism.

8. The windrower of claim 7 wherein the first portion of the front guide track is substantially vertical relative a level ground surface and the second portion is directed in a substantially forward and aft direction.

9. A windrower having mechanism for conditioning crop material severed from a field and for discharging the conditioned material in a rearwardly directed stream as the windrower moves across the field, the windrower comprising:
   a tractor frame;
   a header attached at a forward end of the tractor frame comprising a crop cutting and a crop conditioning mechanism;
   a crop merger attachment comprising a conveyor and a conveyor frame configured to receive crop material from the crop conditioning mechanism and direct the crop material to a side of the windrower to form a windrow on the ground to the side of the windrower, the crop merger attachment being mounted for adjusting movement between an operational, lowered position in which the crop material is directed onto the conveyor and a non-operational, raised position in which the stream of crop material is directed away from the crop merger attachment, the crop merger attachment comprising:
   a conveyor mounting arm connected to the conveyor frame with a pivot mechanism having a substantially vertical pivot axis, wherein a rear end of the conveyor mounting arm is mounted to the tractor frame so as to pivot about a substantially horizontal pivot axis;
   a rear guide bearing attached to the conveyor mounting arm;
   a front guide bearing attached to the conveyor mounting arm at a fixed position intermediate the rear guide bearing and the conveyor frame; and
   a merger bracket having a rear guide track and a front guide track, wherein the rear guide track is substantially linear in a forward and aft direction along the tractor frame, wherein the rear guide bearing is received in the rear guide track such that the rear guide bearing is capable of forward and aft movement in the rear guide track, and wherein the front guide track has a compound shape having first portion and a second portion, with the second portion extending at an angle α relative the first portion, wherein the front guide bearing is received in the front guide track and is moveable between a raised position in which the front guide bearing is at a first end of the first portion and an operational position in which the front guide bearing is moved to a second end at a forward end of the second portion of the front guide track;

wherein an upper surface of the second end of the front guide track is configured to allow for movement of the front guide bearing in an upward direction in the instance the merger attachment were to contact an obstacle in the field to allow the conveyor frame to pivot upwards while the merger attachment is in the operational position.

10. The windrower of claim 9 wherein the first portion of the front guide track is substantially vertical relative a level ground surface and the second portion is directed in a substantially forward and aft direction.

11. The windrower of claim 9 further comprising a pivot linkage extending between a fixed position near the rear of the tractor frame and the conveyor frame, the pivot linkage comprising a crank arm that is povotably pivotably mounted at an inner end to the conveyor mounting arm.

12. The windrower of claim 11 wherein the pivot linkage further comprises a rear link arm having a rear end connected to the tractor frame and a forward end connected to an outer end of the crank arm.

\* \* \* \* \*